United States Patent
Sumasu

(10) Patent No.: US 10,523,149 B2
(45) Date of Patent: Dec. 31, 2019

(54) MOTOR CONTROL DEVICE

(71) Applicant: JTEKT CORPORATION, Osaka-shi, Osaka (JP)

(72) Inventor: Hiroshi Sumasu, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/185,586

(22) Filed: Nov. 9, 2018

(65) Prior Publication Data

US 2019/0149076 A1 May 16, 2019

(30) Foreign Application Priority Data

Nov. 16, 2017 (JP) .................................. 2017-220992

(51) Int. Cl.
*H02P 21/22* (2016.01)
*H02P 27/08* (2006.01)
*H02M 7/5387* (2007.01)
*H02P 21/00* (2016.01)

(52) U.S. Cl.
CPC ........ *H02P 27/08* (2013.01); *H02M 7/53871* (2013.01); *H02P 21/22* (2016.02); *H02P 21/0003* (2013.01)

(58) Field of Classification Search
USPC ........................................................ 318/599
See application file for complete search history.

(56) References Cited

U.S. PATENT DOCUMENTS

| 9,467,078 B2 | 10/2016 | Mukai et al. | |
| 2002/0075702 A1* | 6/2002 | Igarashi | H02M 1/12 363/35 |
| 2004/0008527 A1* | 1/2004 | Honda | H02M 1/12 363/39 |
| 2004/0130923 A1* | 7/2004 | Yin Ho | H02M 1/44 363/131 |
| 2006/0119303 A1* | 6/2006 | Ho | H02M 1/44 318/438 |
| 2013/0062138 A1 | 3/2013 | Naitou et al. | |
| 2017/0274735 A1* | 9/2017 | Kawasaki | H02M 1/14 |

FOREIGN PATENT DOCUMENTS

JP  S-64-50766 A  2/1989

OTHER PUBLICATIONS

Mar. 25, 2019 extended Search Report issued in European Patent Application No. 18206494.9.

* cited by examiner

*Primary Examiner* — Bentsu Ro
(74) *Attorney, Agent, or Firm* — Oliff PLC

(57) ABSTRACT

A motor control device includes: a PWM count computation unit that computes a PWM count for each of three phases for each current control cycle; a PWM count setting unit that sets the PWM count for each phase in the current control cycle as a PWM count for each PWM cycle in the relevant current control cycle for the corresponding phase; and a common mode noise reduction unit that changes the PWM count in a PWM cycle for at least one phase, of two of the three phases other than one particular phase, such that a current that flows through a stray capacitance because of an output voltage for the one particular phase is canceled out with a current flowing through the stray capacitance because of an output voltage for the at least one of the two other phases in at least one PWM cycle in the current control cycle.

4 Claims, 14 Drawing Sheets

FIG. 11A

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S1 | 400 | 400 | 400 | 400 | 400 | 400 | 400 | 400 | 400 | 400 | 4000 |
| Cv SET IN S1 | 300 | 300 | 300 | 300 | 300 | 300 | 300 | 300 | 300 | 300 | 3000 |
| Cw SET IN S1 | 100 | 100 | 100 | 100 | 100 | 100 | 100 | 100 | 100 | 100 | 1000 |

FIG. 11B

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S2 | 400 | 400 | 400 | 400 | 400 | 400 | 400 | 400 | 400 | 400 | 4000 |
| Cv SET IN S2 | 290 | 290 | 290 | 290 | 290 | 290 | 290 | 290 | 290 | 290 | 2900 |
| Cw SET IN S2 | 110 | 110 | 110 | 110 | 110 | 110 | 110 | 110 | 110 | 110 | 1100 |

FIG. 12A

| CYCLE NUMBER i | 1 | 2 | 3 | 4 | 5 | 6 | 7 | 8 | 9 | 10 | TOTAL |
|---|---|---|---|---|---|---|---|---|---|---|---|
| FIRST AMPLITUDE PATTERN | x | -x | x | -x | x | -x | x | -x | x | -x | 0 |
| SECOND AMPLITUDE PATTERN | -x | x | -x | x | -x | x | -x | x | -x | x | 0 |

FIG. 12B

| CYCLE NUMBER i | 1 | 2 | 3 | 4 | 5 | 6 | 7 | 8 | 9 | 10 | TOTAL |
|---|---|---|---|---|---|---|---|---|---|---|---|
| AMPLITUDE FOR V-PHASE | 110 | -110 | 110 | -110 | 110 | -110 | 110 | -110 | 110 | -110 | 0 |
| AMPLITUDE FOR W-PHASE | -70 | 70 | -70 | 70 | -70 | 70 | -70 | 70 | -70 | 70 | 0 |

FIG. 12C

| CYCLE NUMBER i | 1 | 2 | 3 | 4 | 5 | 6 | 7 | 8 | 9 | 10 | TOTAL |
|---|---|---|---|---|---|---|---|---|---|---|---|
| FINAL Cu | 400 | 400 | 400 | 400 | 400 | 400 | 400 | 400 | 400 | 400 | 4000 |
| FINAL Cv | 410 | 190 | 410 | 190 | 410 | 190 | 410 | 190 | 410 | 190 | 3000 |
| FINAL Cw | 30 | 170 | 30 | 170 | 30 | 170 | 30 | 170 | 30 | 170 | 1000 |

FIG. 12D

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu AT ACTUAL TIMING | 400 | 400 | 400 | 400 | 400 | 400 | 400 | 400 | 400 | 400 | 4000 |
| Cv AT ACTUAL TIMING | 400 | 180 | 400 | 180 | 400 | 180 | 400 | 180 | 400 | 180 | 2900 |
| Cw AT ACTUAL TIMING | 40 | 180 | 40 | 180 | 40 | 180 | 40 | 180 | 40 | 180 | 1100 |

FIG. 13A

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S1 | 360 | 360 | 360 | 360 | 360 | 360 | 360 | 360 | 360 | 360 | 3600 |
| Cv SET IN S1 | 400 | 400 | 400 | 400 | 400 | 400 | 400 | 400 | 400 | 400 | 4000 |
| Cw SET IN S1 | 280 | 280 | 280 | 280 | 280 | 280 | 280 | 280 | 280 | 280 | 2800 |

FIG. 13B

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S3 | 360 | 360 | 360 | 360 | 360 | 360 | 360 | 360 | 360 | 360 | 3600 |
| Cv SET IN S3 | 390 | 390 | 390 | 390 | 390 | 390 | 390 | 390 | 390 | 390 | 3900 |
| Cw SET IN S3 | 280 | 280 | 280 | 280 | 280 | 280 | 280 | 280 | 280 | 280 | 2800 |

FIG. 14A

| CYCLE NUMBER i | 1 | 2 | 3 | 4 | 5 | 6 | 7 | 8 | 9 | 10 | TOTAL |
|---|---|---|---|---|---|---|---|---|---|---|---|
| FIRST AMPLITUDE PATTERN | x | -x | x | -x | x | -x | x | -x | x | -x | 0 |
| SECOND AMPLITUDE PATTERN | -x | x | -x | x | -x | x | -x | x | -x | x | 0 |

FIG. 14B

| CYCLE NUMBER i | 1 | 2 | 3 | 4 | 5 | 6 | 7 | 8 | 9 | 10 | TOTAL |
|---|---|---|---|---|---|---|---|---|---|---|---|
| AMPLITUDE FOR U-PHASE | 30 | -30 | 30 | -30 | 30 | -30 | 30 | -30 | 30 | -30 | 0 |
| AMPLITUDE FOR W-PHASE | -110 | 110 | -110 | 110 | -110 | 110 | -110 | 110 | -110 | 110 | 0 |

FIG. 14C

| CYCLE NUMBER i | 1 | 2 | 3 | 4 | 5 | 6 | 7 | 8 | 9 | 10 | TOTAL |
|---|---|---|---|---|---|---|---|---|---|---|---|
| FINAL Cu | 390 | 330 | 390 | 330 | 390 | 330 | 390 | 330 | 390 | 330 | 3600 |
| FINAL Cv | 400 | 400 | 400 | 400 | 400 | 400 | 400 | 400 | 400 | 400 | 4000 |
| FINAL Cw | 170 | 390 | 170 | 390 | 170 | 390 | 170 | 390 | 170 | 390 | 2800 |

FIG. 14D

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu AT ACTUAL TIMING | 390 | 330 | 390 | 330 | 390 | 330 | 390 | 330 | 390 | 330 | 3600 |
| Cv AT ACTUAL TIMING | 390 | 390 | 390 | 390 | 390 | 390 | 390 | 390 | 390 | 390 | 3900 |
| Cw AT ACTUAL TIMING | 170 | 390 | 170 | 390 | 170 | 390 | 170 | 390 | 170 | 390 | 2800 |

MOTOR CONTROL DEVICE

INCORPORATION BY REFERENCE

The disclosure of Japanese Patent Application No. 2017-220992 filed Nov. 16, 2017 including the specification, drawings and abstract, is incorporated herein by reference in its entirety.

BACKGROUND OF THE INVENTION

1. Field of the Invention

The present invention relates to a motor control device configured to drive an electric motor through pulse width modulation (PWM).

2. Description of the Related Art

In a motor control device that performs vector control on a three-phase electric motor, two-phase current command values are computed in each current control cycle. Two-phase voltage command values are computed on the basis of the deviation between the two-phase current command values and detected two-phase current values. The two-phase voltage command values are subjected to a two-phase/three-phase conversion performed using the rotational angle of the electric motor to compute phase voltage command values (three-phase voltage command values) for U-phase, V-phase, and W-phase. Then, a U-phase PWM signal, a V-phase PWM signal, and a W-phase PWM signal with a duty corresponding to the respective phase voltage command values for U-phase, V-phase, and W-phase are generated, and supplied to a three-phase inverter circuit.

Six switching elements that constitute the three-phase inverter circuit are controlled in accordance with the U-phase PWM signal, the V-phase PWM signal, and the W-phase PWM signal. Consequently, a voltage corresponding to the three-phase voltage command values is applied to the three-phase electric motor. Consequently, a motor current that flows through the three-phase electric motor is controlled so as to be equal to the two-phase current command values. (See Japanese Patent Application Publication No. 1-50766 (JP 1-50766 A).)

In the motor control device discussed earlier, a current flows through a stray capacitance that is present between the three-phase electric motor and a frame ground at the time of rise and the time of fall of output voltages (phase voltages) for various phases in each PWM cycle. Since this current flows through the frame ground, noise is occasionally radiated from the frame ground. In the case where the motor control device is mounted on an electric power steering (EPS) system mounted on a vehicle, long positive and negative power supply lines extend from a vehicle power source (battery) to the EPS. Therefore, a noise current that flows through the frame ground intrudes into the positive and negative power supply lines in the vicinity of the vehicle power source through the stray capacitance which is formed between the positive and negative power supply lines and the frame ground. The noise current flows through the long positive and negative power supply lines to radiate noise from the lines. Consequently, common mode noise is generated.

SUMMARY OF THE INVENTION

An object of the present invention is to provide a motor control device that is capable of reducing common mode noise.

An aspect of the present invention provides a motor control device that controls an electric motor on the basis of a PWM signal generated for each of a plurality of PWM cycles included in a current control cycle, the motor control device including: a PWM count computation unit that computes a PWM count for each of three phases for each current control cycle; a PWM count setting unit that sets the PWM count for each phase in the current control cycle as a PWM count for each PWM cycle in the relevant current control cycle for the corresponding phase; and a common mode noise reduction unit that changes the PWM count in a PWM cycle for at least one phase, of two of the three phases other than one desired phase, such that a current that flows through a stray capacitance because of an output voltage for the one desired phase is canceled out with a current that flows through the stray capacitance because of an output voltage for the at least one of the two other phases in at least one PWM cycle in the current control cycle, in which the common mode noise reduction unit includes a PWM count change unit that changes the PWM count for at least one of the two other phases, of a PWM signal for each PWM cycle in the current control cycle for each phase, such that an output voltage waveform for the relevant phase is a waveform obtained by inverting an output voltage waveform for the one desired phase in at least one PWM cycle without changing a total value of PWM counts for the relevant phase in the relevant current control cycle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11A is a schematic table illustrating an example of PWM counts in each PWM cycle for each phase set in step S1;

FIG. 11B is a schematic table illustrating an example of PWM counts in each PWM cycle for each phase set in step S2;

FIG. 12A is a schematic table illustrating an example of two amplitude patterns;

FIG. 12B is a schematic table illustrating an example of an amplitude in each PWM cycle for V-phase and W-phase;

FIG. 12C is a schematic table illustrating an example of the final PWM counts for each phase in each PWM cycle;

FIG. 12D is a schematic table illustrating a PWM count corresponding to the level variation timing of each phase voltage that matches the final PWM count indicated in FIG. 12C;

FIG. 13A is a schematic table illustrating a different example of PWM counts in each PWM cycle for each phase set in step S1;

FIG. 13B is a schematic table illustrating a different example of PWM counts in each PWM cycle for each phase set in step S2;

FIG. 14A is a schematic table illustrating an example of two amplitude patterns;

FIG. 14B is a schematic table illustrating an example of an amplitude in each PWM cycle for U-phase and W-phase;

FIG. 14C is a schematic table illustrating an example of the final PWM counts for each phase in each PWM cycle; and FIG. 14D is a schematic table illustrating a PWM count corresponding to the level variation timing of each phase voltage that matches the final PWM count indicated in FIG. 14C.

DETAILED DESCRIPTION OF EMBODIMENTS

Figure 1:
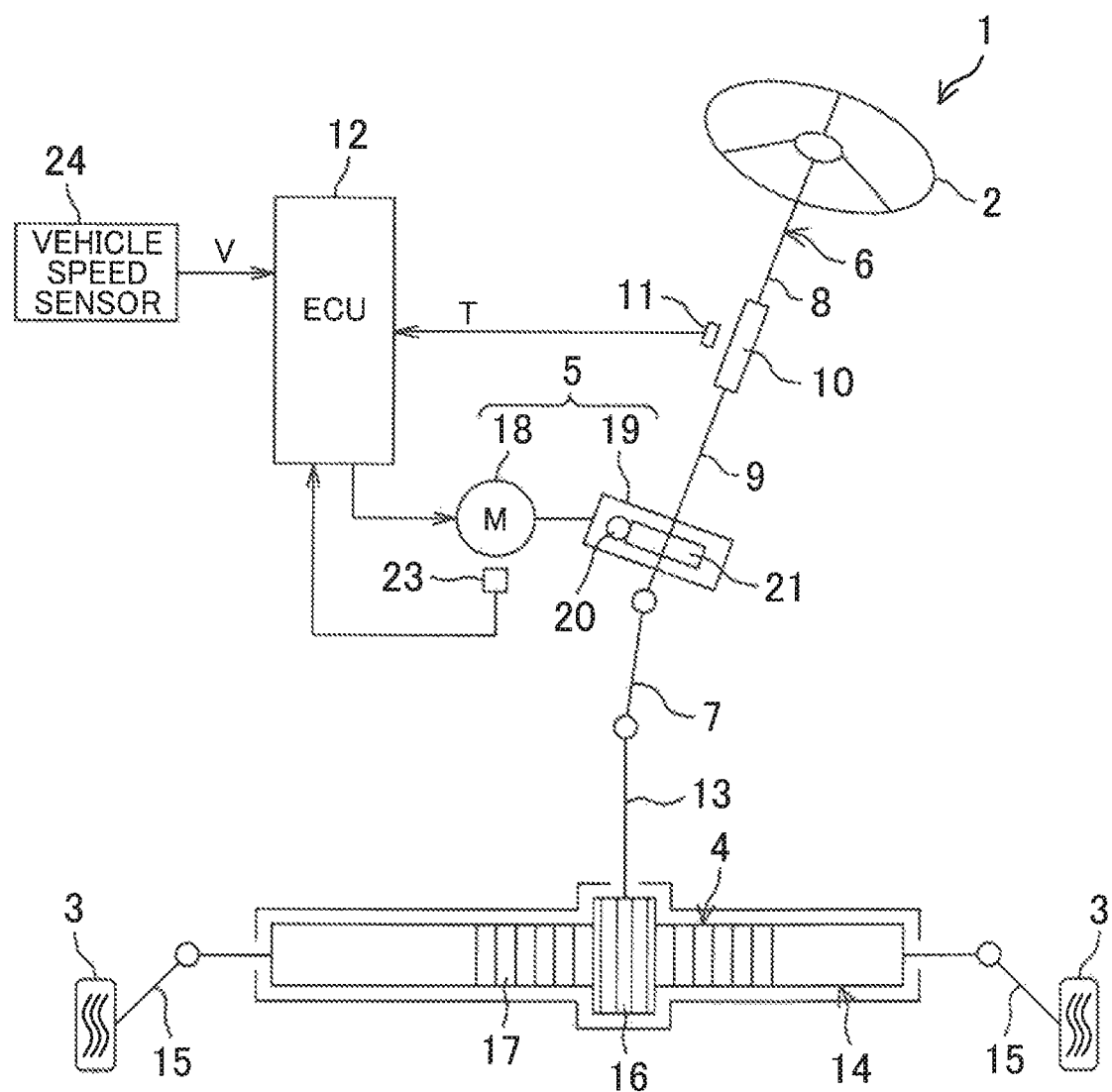
FIG. 1 is a schematic diagram illustrating a schematic configuration of an electric power steering system to which a motor control device according to an embodiment of the present invention is applied.

An embodiment in which the present invention is applied to an electric power steering system will be described in detail below with reference to the accompanying drawings. FIG. 1 is a schematic diagram illustrating a schematic configuration of an electric power steering system to which a motor control device according to an embodiment of the present invention is applied. An electric power steering (EPS) system 1 includes a steering wheel 2, a steering operation mechanism 4, and a steering assist mechanism 5. The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 11 is disposed in the vicinity of the torsion bar 10. The torque sensor 11 detects steering torque T applied to the steering wheel 2 on the basis of the amount of relative rotational displacement between the input shaft 8 and the output shaft 9. In the embodiment, the steering torque T which is detected by the torque sensor 11 is detected as a positive value when the vehicle is steered to the right, and as a negative value when the vehicle is steered to the left, for example. The magnitude of the steering torque T is larger as the absolute value of the positive or negative value is larger.

The steering operation mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end (the lower end in FIG. 1) of the pinion shaft 13.

The rack shaft 14 extends linearly along the right-left direction of the automobile. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 for steering assist, and a speed reduction mechanism 19 configured to transfer output torque from the electric motor 18 toward the steering operation mechanism 4. In the embodiment, the electric motor 18 is a three-phase brushless motor. The electric motor 18 is provided with a rotational angle sensor 23 such as a resolver, for example, configured to detect the rotational angle of a rotor of the electric motor 18. The speed reduction mechanism 19 is composed of a worm gear mechanism that includes a worm shaft 20 and a worm wheel 21 meshed with the worm shaft 20.

The worm shaft 20 is rotationally driven by the electric motor 18. The worm wheel 21 is coupled so as to be rotatable together with the steering shaft 6. The worm wheel 21 is rotationally driven by the worm shaft 20. When the worm shaft 20 is rotationally driven by the electric motor 18, the worm wheel 21 is rotationally driven to rotate the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm shaft 20 is rotationally driven by the electric motor 18 to enable steering assist by the electric motor 18.

The vehicle is provided with a vehicle speed sensor 24 configured to detect a vehicle speed V. The steering torque T which is detected by the torque sensor 11, the vehicle speed V which is detected by the vehicle speed sensor 24, an output signal from the rotational angle sensor 23, etc. are input to an electronic control unit (ECU) 12. The ECU 12 controls the electric motor 18 on the basis of such input signals.

Figure 2:
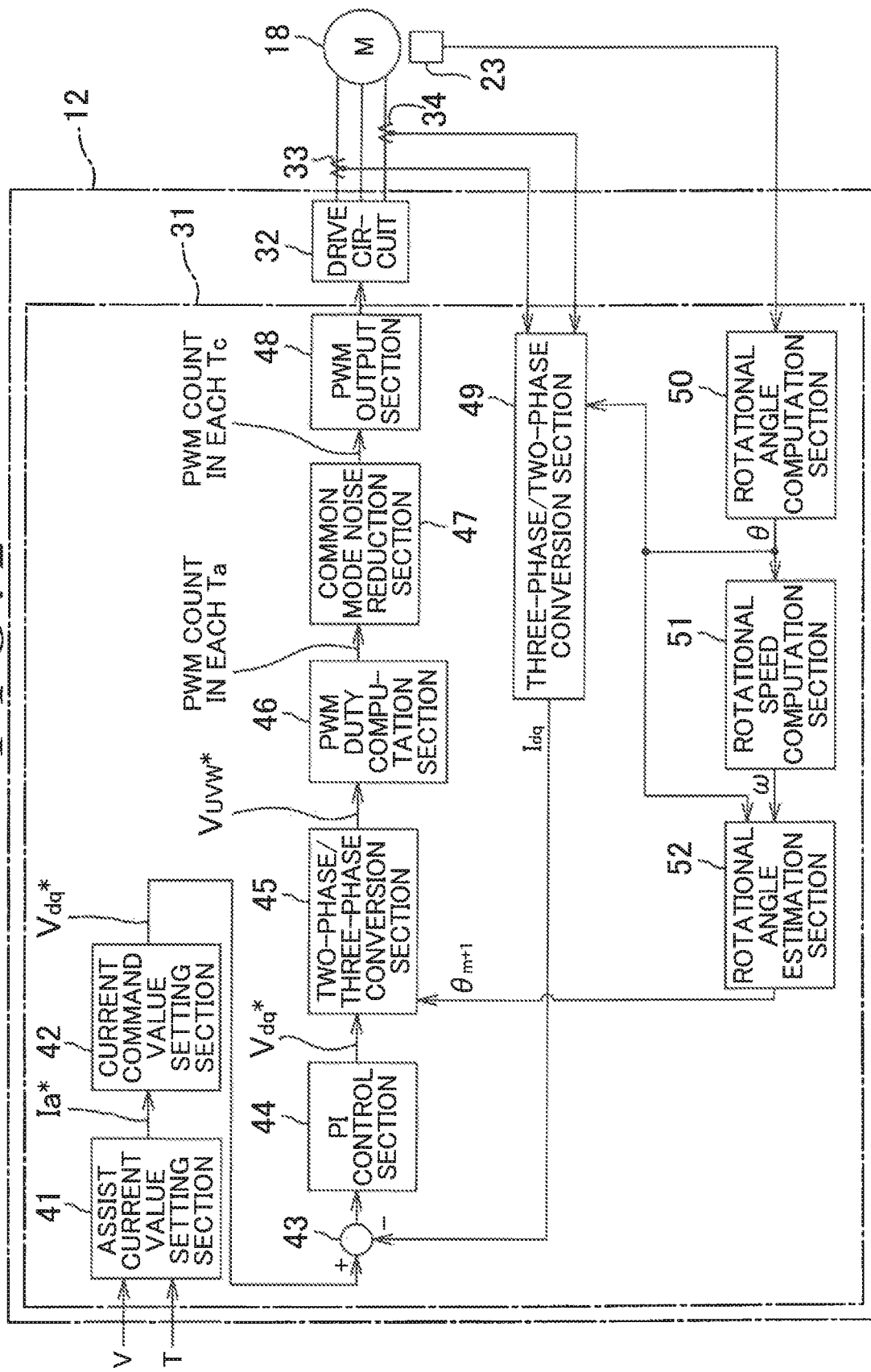
FIG. 2 is a block diagram illustrating the electric configuration of an ECU.
Figure 3:
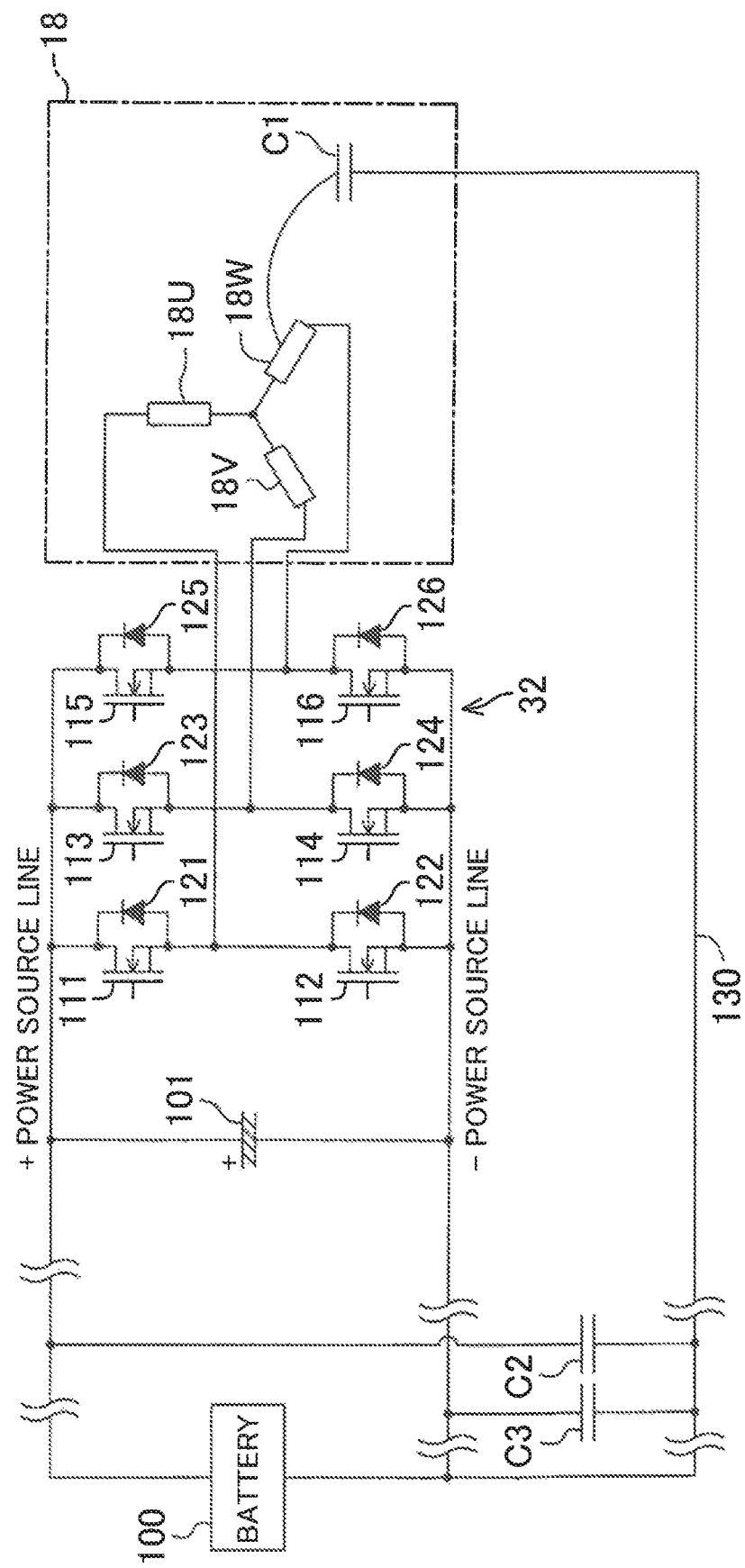
FIG. 3 is an electric circuit diagram mainly illustrating the configuration of a motor drive circuit.

FIG. 2 is a block diagram illustrating the overall electric configuration of the ECU 12. The ECU 12 includes a microcomputer 31 and a motor drive circuit 32 that is controlled by the microcomputer 31 and that supplies power to the electric motor 18. FIG. 3 is an electric circuit diagram mainly illustrating the configuration of the motor drive circuit 32. The electric motor 18 may be a three-phase brushless motor, for example. The electric motor 18 includes a rotor (not illustrated) that serves as a field, and a stator that includes stator coils 18U, 18V, and 18W (see FIG. 3) for U-phase, V-phase, and W-phase, respectively.

The motor drive circuit 32 is a three-phase inverter circuit. The motor drive circuit 32 includes a smoothing capacitor 101 connected in series with a power source (battery) 100, a plurality of switching elements 111 to 116, and a plurality of diodes 121 to 126. The smoothing capacitor 101 is connected between both terminals of the power source 100. In the embodiment, the switching elements 111 to 116 are each constituted from an n-channel metal oxide semiconductor field effect transistor (MOSFET). Hereinafter, the switching elements 111 to 116 will be occasionally referred to as FETs 111 to 116.

The plurality of FETs 111 to 116 include an upper FET 111 for U-phase, a lower FET 112 for U-phase connected in series thereto, an upper FET 113 for V-phase, a lower FET 114 for V-phase connected in series thereto, an upper FET 115 for W-phase, and a lower FET 116 for W-phase connected in series thereto. The switching elements 111 to 116 are connected in inverse parallel with the diodes 121 to 126, respectively.

The drain of the upper FET 111, 113, 115 is connected to a positive electrode terminal of the smoothing capacitor 101. The source of the upper FET 111, 113, 115 is connected to the drain of the lower FET 112, 114, 116, respectively. The source of the lower FET 112, 114, 116 is connected to a negative electrode terminal of the smoothing capacitor 101. The point of connection between the upper FET 111 and the lower FET 112 for U-phase is connected to the stator coil 18U for U-phase of the electric motor 18. The point of connection between the upper FET 113 and the lower FET 114 for V-phase is connected to the stator coil 18V for V-phase of the electric motor 18. The point of connection between the upper FET 115 and the lower FET 116 for W-phase is connected to the stator coil 18W for W-phase of the electric motor 18. The FETs 111 to 116 are controlled on the basis of a PWM signal output from a PWM output section 48 (see FIG. 2) to be discussed later.

In FIG. 3, the power source 100 is mounted on the vehicle. A negative (−) electrode of the power source 100 is electrically connected to a frame (chassis) 130, which is made of metal, of the vehicle. Therefore, the frame 130 is at the same potential as the negative electrode of the power source 100. The electric power steering system 1 on which the electric motor 18 is mounted is attached to the frame 130 by a bolt or the like. The + power source line and the − power source line of the ECU are connected to the positive and negative electrodes, respectively, of the power source 100 through long lines. Therefore, a stray capacitance C1 is present between the electric motor 18 and the frame 130. Stray capacitances C2 and C3 are present between the positive and negative power source lines, respectively, which connect between the power source 100 and the electric power steering system 1, and the frame ground.

Returning to FIG. 2, two current sensors 33 and 34 are provided in power supply lines configured to connect between the motor drive circuit 32 and the electric motor 18. Such current sensors 33 and 34 are provided so as to be able to detect phase currents that flow through two of three power supply lines configured to connect between the motor drive circuit 32 and the electric motor 18. The microcomputer 31 includes a CPU and a memory (such as a read-only memory (ROM), a random-access memory (RAM), or a non-volatile memory). The microcomputer 31 executes a predetermined program to function as a plurality of function processing sections. The plurality of function processing sections include an assist current value setting section 41, a current command value setting section 42, a current deviation computation section 43, a proportional-integral (PI) control section 44, a two-phase/three-phase conversion section 45, a PWM duty computation section 46, a common mode noise reduction section 47, the PWM output section 48, a three-phase/two-phase conversion section 49, a rotational angle computation section 50, a rotational speed computation section 51, and a rotational angle estimation section 52.

Figure 4A:
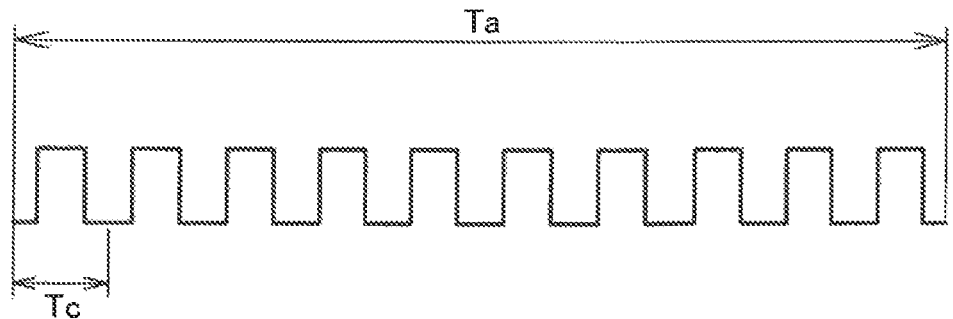
FIG. 4A is a schematic chart illustrating the relationship between a PWM signal cycle Tc and a current control cycle Ta.

As indicated in FIG. 4A, a cycle (hereinafter referred to as a "PWM cycle") Tc of the PWM signal is shorter than a current control cycle Ta. The current control cycle Ta is the computation cycle of the control loop of the motor current. The current control cycle Ta is determined in consideration of the scale of the program, the computation capacity of the microcomputer 31, etc. In the embodiment, PWM duties are updated by the PWM duty computation section 46 at the first timing in the present current control cycle Ta to output updated PWM duties Cu, Cv, and Cw. In the embodiment, Tc is one-tenth of Ta. In other words, each current control cycle Ta includes ten PWM cycles Tc. The first cycle of the ten PWM cycles Tc is occasionally referred to as a first cycle, and the subsequent cycles are occasionally referred to as second, third, . . . , ninth, and tenth cycles. The cycle number of the PWM cycles is occasionally represented by the symbol "i" (i=1, 2, . . . , 9, and 10). The frequency (=1/Tc) of the PWM signal is called a carrier frequency.

Figure 4B:
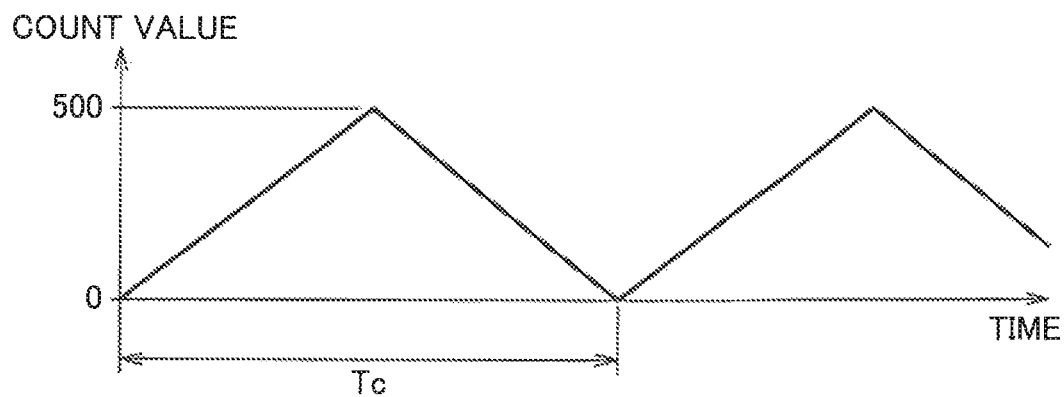
FIG. 4B is a waveform chart illustrating a carrier waveform.

A PWM waveform generation method according to the present embodiment will be described. The clocks of a PWM clock frequency generated by a clock generator (not illustrated) in the microcomputer 31 are counted up and counted down by a counter (not illustrated). The count value of the counter is indicated in FIG. 4B in which the horizontal axis represents the time and the vertical axis represents the count value. The count value is interpreted as an unsigned integer. The count value is occasionally called a carrier count. In the embodiment, the waveform in FIG. 4B is a carrier waveform. The carrier waveform is a triangular waveform. One cycle of the triangular waveform is equal to Tc. The frequency (carrier frequency) of the PWM signal is determined by the maximum value of the carrier waveform, that is, the maximum value of the count value. In the present embodiment, the PWM clock frequency is 100 [MHz], and the frequency (hereinafter referred to as the "PWM frequency") of the PWM signal is set to 100 [kHz]. Therefore, the maximum value of the count value is 100,000,000÷100,000÷2=500. 100,000,000/100,000 is divided by 2 since the clocks are counted up and down.

Figure 4C:
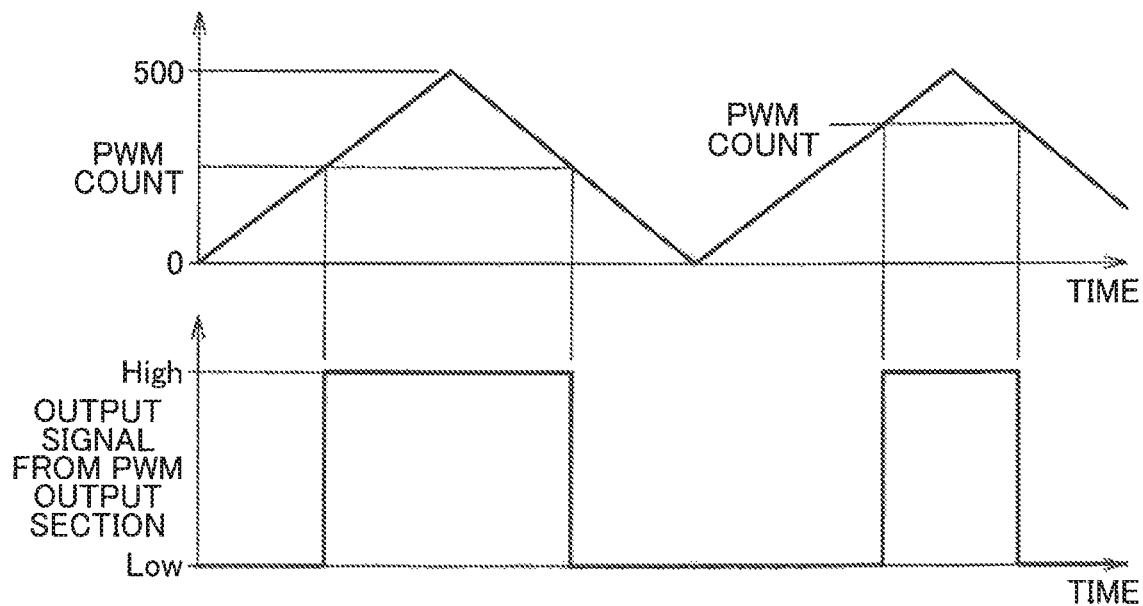
FIG. 4C is a schematic chart illustrating a PWM signal generation method.

As illustrated in FIG. 4C, the PWM output section 48 (see FIG. 2) compares a given PWM count and the count value of the counter, and outputs a High signal or a Low signal to the motor drive circuit 32 (see FIG. 2). The PWM output section 48 outputs a High signal (or a Low signal) while the count value of the counter is equal to or more than the PWM count, and outputs a Low signal (or a High signal) otherwise, for example. The High signal and the Low signal are used as the PWM signal.

In the embodiment, the following two patterns are provided as variation patterns (on/off patterns) of the on/off state of the upper FETs and the lower FETs in the PWM cycle Tc.

First on/off pattern: a pattern in which the on/off state is varied, from the start of the carrier count, in the order of upper FET on state→lower FET on state→upper FET on state Second on/off pattern: a pattern in which the on/off state is varied, from the start of the carrier count, in the order of lower FET on state→upper FET on state→lower FET on state In the embodiment, the upper and lower FETs for two of U-phase, V-phase, and W-phase are controlled in accordance with the same pattern that is one of the first on/off pattern and the second on/off pattern, and the upper and lower FETs for the one remaining phase are controlled in accordance with the other pattern. One of the two phases, the upper and lower FETs for which are controlled in accordance with one of the on/off patterns, will be occasionally referred to as A-phase, the other of two such phases will be occasionally referred to as B-phase, and the one remaining phase will be occasionally referred to as C-phase.

In the embodiment, the upper and lower FETs for U-phase and W-phase are controlled in accordance with the first on/off pattern in the PWM cycles Tc, and the upper and lower FETs for V-phase are controlled in accordance with the second on/off pattern in the PWM cycles Tc. Thus, in the embodiment, one of U-phase and W-phase corresponds to A-phase, the other corresponds to B-phase, and V-phase corresponds to C-phase.

Returning to FIG. 2, the rotational angle computation section 50 computes a rotational angle θ (electrical angle) of the rotor of the electric motor 18 on the basis of an output signal from the rotational angle sensor 23 in each current control cycle Ta. The rotor rotational angle θ, which is computed by the rotational angle computation section 50, is provided to the three-phase/two-phase conversion section 49, the rotational speed computation section 51, and the rotational angle estimation section 52. In the embodiment, the rotor rotational angle θ is acquired (detected) at the timing at the middle of the current control cycle Ta.

The rotational speed computation section 51 computes a rotational speed (angular velocity) ω of the rotor of the electric motor 18 by differentiating the rotor rotational angle θ, which is computed by the rotational angle computation section 50, with respect to time. The rotational speed ω, which is computed by the rotational speed computation section 51, is provided to the rotational angle estimation section 52. The rotational angle estimation section 52 estimates a rotor rotational angle $\theta_{(m+1)}$, at the middle of the next current control cycle Ta on the basis of the following formula (1) using the rotor rotational angle $\theta_{(m-1)}$ at the middle of the previous current control cycle Ta, which is acquired in the previous current control cycle Ta.

$$\theta_{(m+1)} = \theta_{(m-1)} + \omega \cdot 2Ta \quad (1)$$

Figure 5:
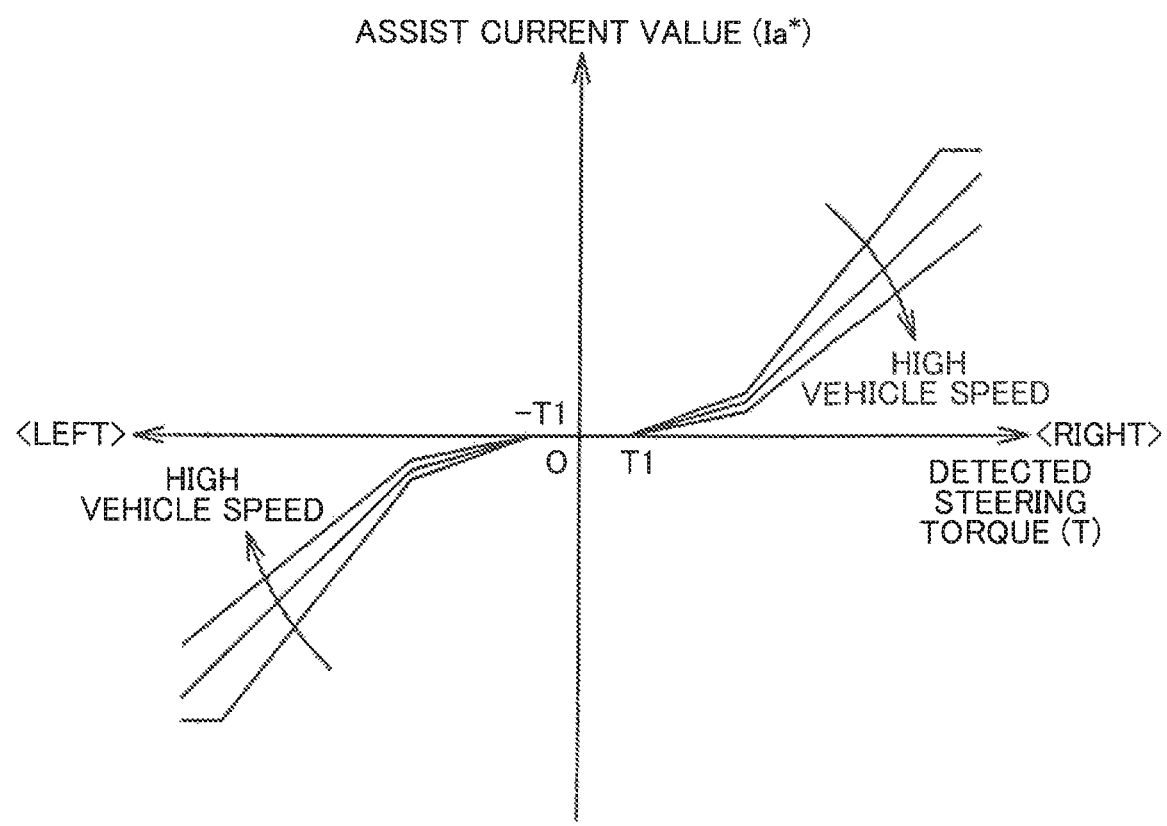
FIG. 5 is a graph illustrating an example of an assist current value Ia* set with respect to detected steering torque T.

The rotor rotational angle $\theta_{(m+1)}$ in the next current control cycle Ta, which is estimated by the rotational angle estimation section 52, is provided to the two-phase/three-phase conversion section 45. The assist current value setting section 41 sets an assist current value Ia* in each current control cycle Ta on the basis of the detected steering torque T, which is detected by the torque sensor 11, and the vehicle speed V, which is detected by the vehicle speed sensor 24. An example of the assist current value Ia* which is set with respect to the detected steering torque T is illustrated in FIG. 5. The detected steering torque T has a positive value when the torque is applied to steer the vehicle to the right, and a negative value when the torque is applied to steer the vehicle to the left, for example. The assist current value Ia* has a positive value when the electric motor 18 should generate a steering assist force for steering the vehicle to the right, and a negative value when the electric motor 18 should generate a steering assist force for steering the vehicle to the left. The assist current value Ia* becomes positive when the detected steering torque T has a positive value, and becomes negative when the detected steering torque T has a negative value.

When the detected steering torque T has a very small value in the range (torque dead band) of −T1 to T1 (e.g. T1=0.4 N·m), the assist current value Ia* is set to zero. In the case where the detected steering torque T has a value outside the range of −T1 to T1, the assist current value Ia* is set such that the absolute value thereof becomes larger as the absolute value of the detected steering torque T becomes larger. The assist current value Ia* is also set such that the absolute value thereof becomes smaller as the vehicle speed V, which is detected by the vehicle speed sensor 24, becomes higher. Consequently, a large assist force is generated during low-speed travel, and a small assist force is generated during high-speed travel.

The current command value setting section 42 sets the values of currents that should flow on the coordinate axes of a dq coordinate system as current command values on the basis of the assist current value Ia*, which is set by the assist current value setting section 41. Specifically, the current command value setting section 42 sets a d-axis current command value $I_d^*$ and a q-axis current command value $I_q^*$ (which will hereinafter be referred to collectively as "two-phase current command values $I_{dq}^*$"). Further specifically, the current command value setting section 42 sets the q-axis current command value $I_q^*$ to the assist current value Ia*, which is set by the assist current value setting section 41, and sets the d-axis current command value $I_d^*$ to zero. The two-phase current command values $I_{dq}^*$, which are set by the current command value setting section 42, are provided to the current deviation computation section 43.

The three-phase/two-phase conversion section 49 first computes a U-phase current $I_U$, a V-phase current $I_V$, and a W-phase current $I_W$ (which will hereinafter be referred to collectively as "detected three-phase currents $I_{UVW}$") from the phase currents for two phases, which are detected by the current sensors 33 and 34. Then, the three-phase/two-phase conversion section 49 performs a coordinate conversion on the detected three-phase currents $I_{UVW}$ for the UVW coordinate system into detected two-phase currents $I_{dq}$ for the dq coordinate system. The detected two-phase currents $I_{dq}$ include a detected d-axis current $I_d$ and a detected q-axis current $I_q$. The rotor rotational angle θ, which is computed by the rotational angle computation section 50, is used in the coordinate conversion.

The current deviation computation section 43 computes a deviation of the detected d-axis current $I_d$ from the d-axis current command value $I_d^*$ and a deviation of the detected q-axis current $I_q$ from the q-axis current command value $I_q^*$. Such deviations are provided to the PI control section 44. The PI control section 44 generates two-phase voltage command values $V_{dq}^*$ (a d-axis voltage command value $V_d^*$ and a q-axis voltage command value $V_q^*$) to be applied to the electric motor 18 by performing PI computation on the current deviations which are computed by the current deviation computation section 43. The two-phase voltage command values $V_{dq}^*$ are provided to the two-phase/three-phase conversion section 45.

The two-phase/three-phase conversion section 45 performs a two-phase/three-phase conversion on the two-phase voltage command values $V_{dq}^*$, which are computed by the PI control section 44 in the present current control cycle Ta, using an estimated rotational angle value $\theta_{(m+1)}$ for the next current control cycle Ta, which is computed by the rotational angle estimation section 52 in the present current control cycle Ta. Consequently, three-phase voltage command values $V_{UVW}*$ for the next current control cycle Ta are computed. The three-phase voltage command values $V_{UVW}*$ include a U-phase voltage command value $V_U*$, a V-phase voltage command value $V_V*$, and a W-phase voltage command value $V_W*$. Consequently, three-phase voltage command values $V_{UVW}*$ for the next current control cycle Ta are obtained.

The three-phase voltage command values $V_{UVW}*$ for the next current control cycle Ta, which are obtained by the two-phase/three-phase conversion section 45, are provided to the PWM duty computation section 46. The PWM duty computation section 46 generates a U-phase PWM count (PWM duty), a V-phase PWM count, and a W-phase PWM count for the next current control cycle Ta on the basis of the three-phase voltage command values $V_{UVW}*$ for the next current control cycle Ta, and provides such counts to the common mode noise reduction section 47.

The U-phase PWM count, the upper and lower FETs for which are controlled in accordance with the first on/off pattern, is calculated as follows. That is, the PWM duty computation section 46 computes the U-phase PWM count Cu for a certain current control cycle Ta on the basis of the following formula (2) using the U-phase voltage command value $V_U*$ for the relevant current control cycle Ta, which is obtained by the two-phase/three-phase conversion section 45, and the maximum value Cmax of the PWM count.

$$Cu = V_U^* \times (C\max/Vb) \tag{2}$$
$$= V_U^* \times (500/Vb)$$

In the formula (2), Vb is the power source voltage for the motor drive circuit 32 (output voltage of the power source 100). The W-phase PWM count Cw, the upper and lower FETs for which are controlled in accordance with the first on/off pattern, can be computed by using the W-phase voltage command value $V_W*$ in place of the U-phase voltage command value $V_U*$ on the right side of the formula (2).

The V-phase PWM count Cv, the upper and lower FETs for which are controlled in accordance with the second on/off pattern, is calculated as follows. That is, the PWM duty computation section 46 computes the V-phase PWM count Cv for a certain current control cycle Ta on the basis of the following formula (3) using the V-phase voltage command value $V_V*$ for the relevant current control cycle Ta, which is obtained by the two-phase/three-phase conversion section 45, and the maximum value Cmax of the PWM count.

$$Cv = \text{maximum value of } PWM \text{ count} - \tag{3}$$
$$\{V_V^* \times (\text{maximum value of } PWM \text{ count}/Vb)\}$$
$$= \text{maximum value of } PWM \text{ count} -$$
$$\{V_V^* \times (500/Vb)\}$$

In the formula (3), Vb is the power source voltage for the motor drive circuit 32 (output voltage of the power source 100). The common mode noise reduction section 47 is provided to reduce common mode noise by canceling out a part of a noise current generated by turning on and off of the switching element for at least one phase in the motor drive circuit 32 with a part of a noise current generated by turning on and off of the switching element for a different phase. The common mode noise reduction section 47 performs a process (noise reduction process) for reducing common mode noise on the U-phase PWM count Cu, V-phase PWM count Cv, and W-phase PWM count Cw for the next current control cycle Ta, which are provided from the PWM duty computation section 46. Consequently, the U-phase PWM count, the V-phase PWM count, and the W-phase PWM count for each PWM cycle Tc in the next current control cycle Ta are obtained. Operation of the common mode noise reduction section 47 will be discussed in detail later.

The U-phase PWM count, V-phase PWM count, and W-phase PWM count for each PWM cycle Tc in the next current control cycle Ta after being subjected to the noise reduction process, which is performed by the common mode noise reduction section 47, are provided to the PWM output section 48. The PWM output section 48 stores the U-phase PWM count, V-phase PWM count, and W-phase PWM count for each PWM cycle Tc in the current control cycle Ta, which are provided from the common mode noise reduction section 47, for a plurality of current control cycles. The PWM output section 48 generates U-phase PWM signal, V-phase PWM signal, and W-phase PWM signal for each PWM cycle Tc in the present current control cycle Ta on the basis of the U-phase PWM count, V-phase PWM count, and W-phase PWM count for each PWM cycle Tc in the present current control cycle Ta, which are provided from the common mode noise reduction section 47 in the previous current control cycle Ta, and supplies such signals to the motor drive circuit 32. Specifically, the PWM output section 48 generates, for each PWM cycle Tc in the present current control cycle Ta, U-phase PWM signal, V-phase PWM signal, and W-phase PWM signal with a duty corresponding to the U-phase PWM count, V-phase PWM count, and W-phase PWM count, respectively, for each PWM cycle Tc in the relevant current control cycle Ta, and supplies such signals to the motor drive circuit 32.

The six FETs 111 to 116, which constitute the motor drive circuit 32, are controlled in accordance with the PWM signals, which are provided from the PWM output section 48. Consequently, a voltage corresponding to the three-phase voltage command values $V_{UVW}*$ for each PWM cycle Tc is applied to the stator coils 18U, 18V, and 18W for respective phases of the electric motor 18. The current deviation computation section 43 and the PI control section 44 constitute a current feedback control unit. The current feedback control unit operates to control the motor current which flows through the electric motor 18 so that the motor current approximates the two-phase current command values $I_{dq}*$ which are set by the current command value setting section 42.

The common mode noise reduction section 47 will be described in detail below. First, the basic idea of the common mode noise reduction which is performed by the common mode noise reduction section 47 will be described with reference to FIG. 6. In the case where the waveform of an output voltage (hereinafter referred to as a first phase voltage) for a certain one of the three phases is as indicated by (a) in FIG. 6, a current that flows through the stray capacitance C1 (see FIG. 3), which is present between the electric motor 18 and the frame ground, because of the first phase voltage, is as indicated by (c) in FIG. 6. That is, a current in the − direction flows through the stray capacitance C1 at the time of fall t1 of the first phase voltage, and a current in the + direction flows through the stray capacitance C1 at the time of rise t2 of the first phase voltage.

Figure 6:
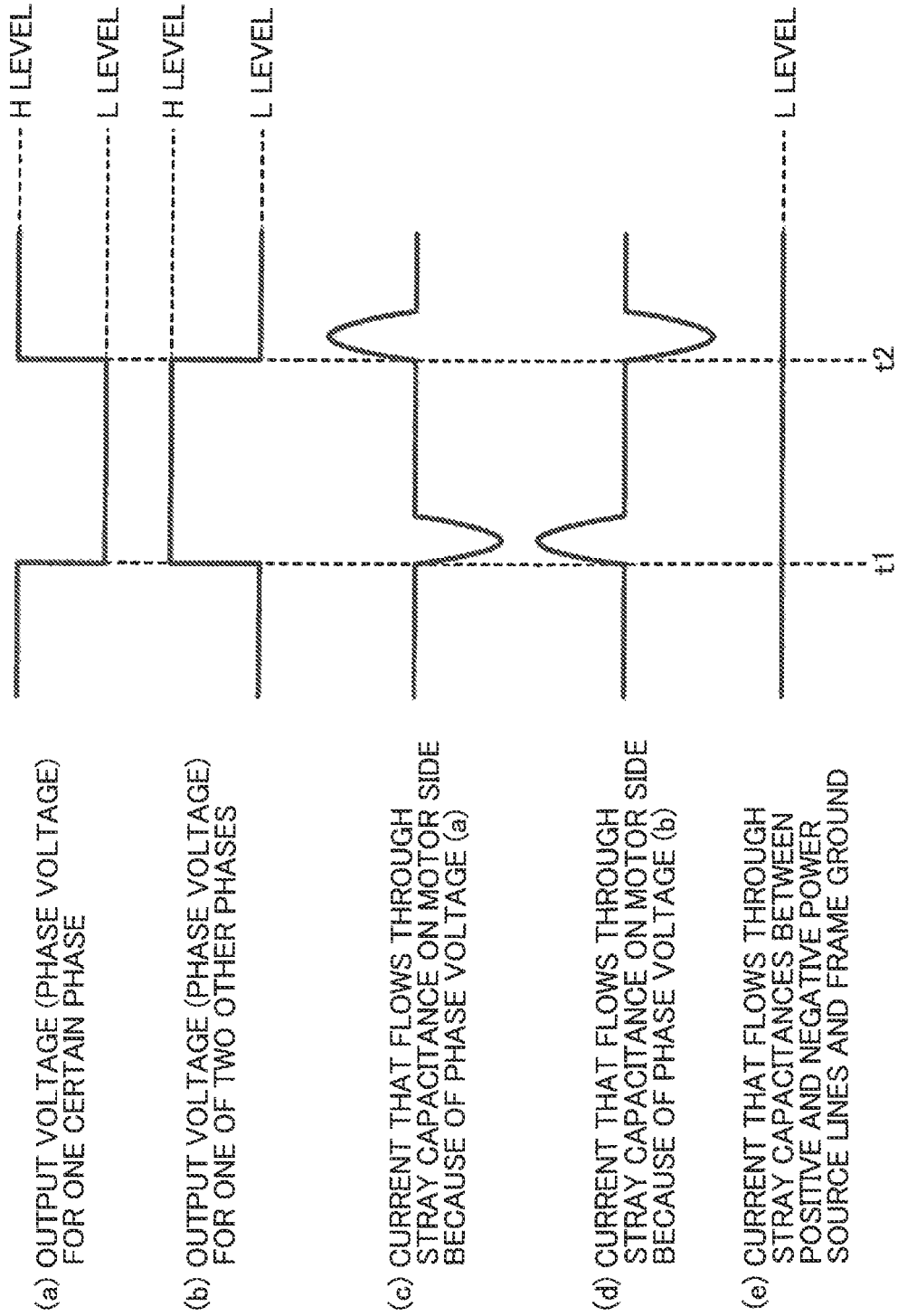
FIG. 6 illustrates the basic idea of a common mode noise reduction performed by a common mode noise reduction section.

If the waveform of an output voltage (hereinafter referred to as a second phase voltage) for one of the two other phases is a waveform obtained by inverting the waveform of the first phase voltage of (a) in FIG. 6 as indicated by (b) in FIG. 6, a current that flows through the stray capacitance C1 (see FIG. 3), which is present between the electric motor 18 and the frame ground, because of the second phase voltage, is as indicated by (d) in FIG. 6. That is, a current in the + direction flows through the stray capacitance C1 at the time of rise t1 of the second phase voltage, and a current in the − direction flows through the stray capacitance C1 at the time of fall t2 of the second phase voltage. Thus, the current which flows through the stray capacitance C1 because of the first phase voltage and the current which flows through the stray capacitance C1 because of the second phase voltage cancel out each other at each of the time t1 and the time t2. Therefore, as indicated by (e) in FIG. 6, the currents which flow through the stray capacitances C2 and C3 (see FIG. 3), which are present between the positive and negative power source lines and the frame ground, respectively, are reduced.

Figure 7:
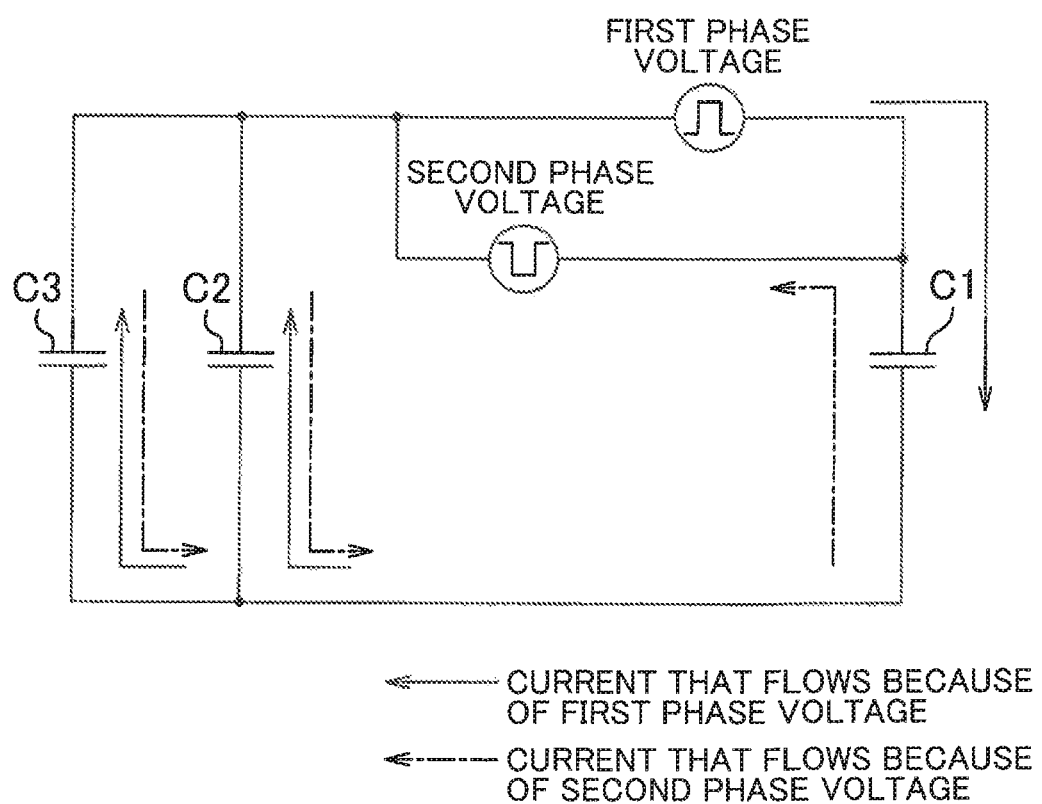
FIG. 7 is a circuit diagram illustrating an equivalent circuit that places a focus on common mode noise currents.

FIG. 7 illustrates an equivalent circuit that places a focus on common mode noise currents. The first phase voltage and the second phase voltage can be considered as noise generation sources. The positive and negative electrodes of the power source 100 can be considered as being short-circuited for alternating currents such as the common mode noise currents. In FIG. 7, common mode noise currents due to the first phase voltage flow as indicated by the continuous arrows. Common mode noise currents due to the second phase voltage flow as indicated by the long dashed short dashed arrows. Thus, the common mode noise currents which flow through the stray capacitances C2 and C3 are opposite in direction to each other, and thus cancel out each other. As a result, the total common mode noise currents are reduced.

The common mode noise reduction section 47 changes the PWM count in a PWM cycle for at least one phase, of two of the three phases other than one predetermined phase, such that a current that flows through a stray capacitance because of an output voltage for the one predetermined phase is canceled out with a current that flows through the stray capacitance because of an output voltage for the at least one of the two other phases in at least one PWM cycle in a current control cycle.

Figure 8:
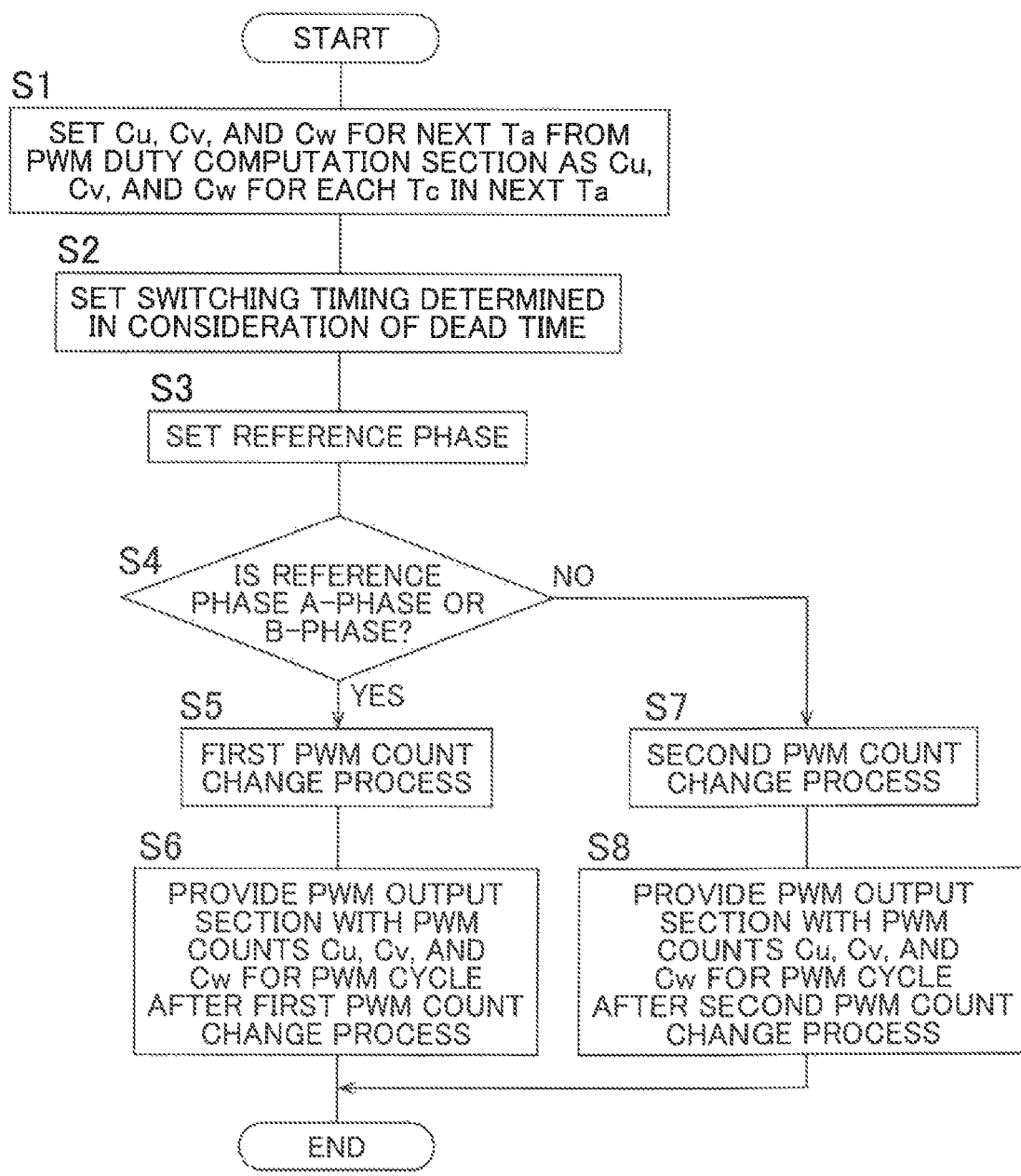
FIG. 8 is a flowchart illustrating an example of operation of the common mode noise reduction section.

FIG. 8 is a flowchart illustrating an example of operation of the common mode noise reduction section. The common mode noise reduction section 47 (see FIG. 2) first sets the U-phase, V-phase, and W-phase PWM counts Cu, Cv, and Cw for the next current control cycle Ta, which are provided from the PWM duty computation section 46, as the U-phase, V-phase, and W-phase PWM counts Cu, Cv, and Cw for each PWM cycle Tc in the next current control cycle Ta (step S1).

FIG. 11A is a schematic table illustrating an example of the U-phase, V-phase, and W-phase PWM counts Cu, Cv, and Cw in each PWM cycle Tc in the current control cycle Ta set in step S1. Next, the common mode noise reduction section 47 sets a switching timing determined in consideration of the dead time for each phase (step S2).

Figure 9:
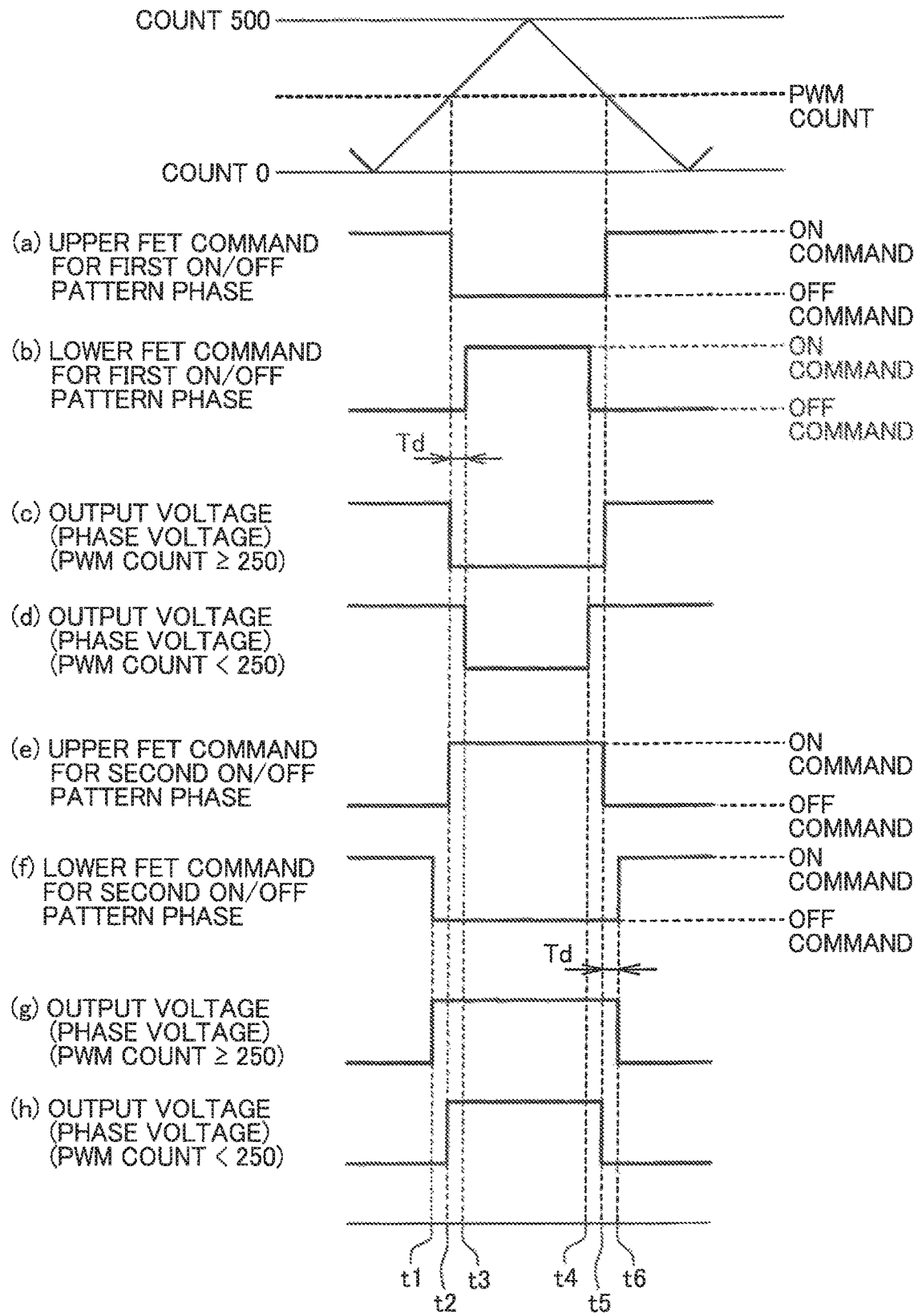
FIG. 9 is a schematic chart mainly illustrating the relationship between a PWM count and an upper FET command and a lower FET command for each phase.

FIG. 9 is a schematic chart mainly illustrating the relationship between a PWM count and an upper FET command and a lower FET command for each phase. In other words, FIG. 9 is a schematic chart illustrating an example of operation of the PWM output section 48 (see FIG. 2) for each phase. In the embodiment, as discussed earlier, the carrier waveform is a triangular waveform, and the value that can be output as the PWM count is set to 0 to 500. In the embodiment, the count value corresponding to the dead time is set to 10.

An upper FET command and a lower FET command for U-phase and W-phase (first on/off pattern phases), the upper and lower FETs for which are controlled in accordance with the first on/off pattern, will be described. The switching timing of the upper FETs for U-phase and W-phase is set such that the upper FET command for U-phase and W-phase is an off command when the carrier count is larger than the PWM count. That is, as indicated by (a) in FIG. 9, the upper FET command for U-phase and W-phase is varied from an on command to an off command when the carrier count becomes equal to the PWM count (time t2) while the carrier count is counting up. The upper FET command for U-phase and W-phase is varied from an off command to an on command when the carrier count becomes equal to the PWM count (time t5) while the carrier count is counting down.

As indicated by (b) in FIG. 9, when a dead time Td elapses (time t3) from the time t2, the lower FET command for U-phase and W-phase is varied from an off command to an on command. The lower FET command for U-phase and W-phase is varied from an on command to an off command at the time (time t4) earlier than time t5 by the dead time Td. An upper FET command and a lower FET command for V-phase (second on/off pattern phase), the upper and lower FETs for which are controlled in accordance with the second on/off pattern, will be described. In the embodiment, the switching timing of the upper FETs for V-phase is set such that the upper FET command for V-phase is an on command when the carrier count is larger than the PWM count. That is, as indicated by (e) in FIG. 9, the upper FET command for V-phase is varied from an off command to an on command when the carrier count becomes equal to the PWM count (time t2) while the carrier count is counting up. The upper FET command for V-phase is varied from an on command to an off command when the carrier count becomes equal to the PWM count (time t5) while the carrier count is counting down.

As indicated by (f) in FIG. 9, the lower FET command for V-phase is varied from an on command to an off command at the time (time t1) earlier than the time t2 by the dead time Td. When the dead time Td elapses (time t6) from the time t5, the lower FET command for V-phase is varied from an off command to an on command. An output voltage (phase voltage) for a certain phase during a dead time period will be described with reference to FIGS. 10A and 10B. Here, U-phase will be described as an example. The same description also applies to the two other phases.

Figure 10A:
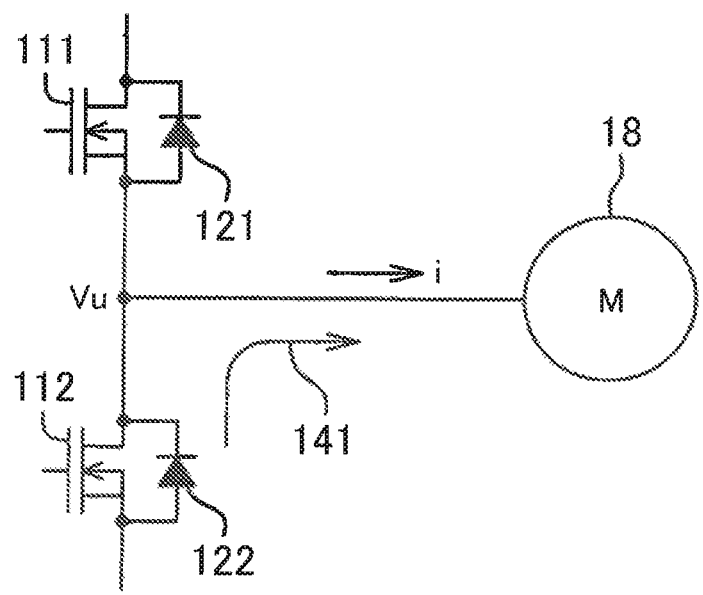
FIG. 10A illustrates a current path during a dead time period with a current flowing from the point of connection between an upper FET and a lower FET toward an electric motor.

As indicated by the symbol "i" in FIG. 10A, in a state in which a current is flowing from the point of connection between the upper FET 111 and the lower FET 112 toward the electric motor 18, a current flows through the diode 122, which is connected in inverse parallel with the lower FET 112, as indicated by an arrow 141 during a dead time period. Thus, the output voltage (phase voltage) Vu is at L level during the dead time period. Therefore, the period during which the phase voltage Vu is at L level is the same as an off period of the upper FET 111.

Figure 10B:
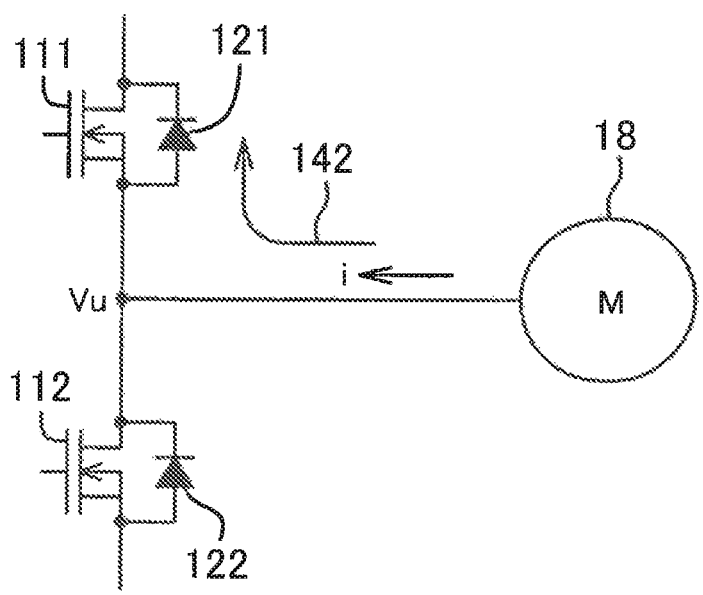
FIG. 10B illustrates a current path during a dead time period with a current flowing from the electric motor toward the point of connection between the upper FET and the lower FET.

As indicated by the symbol "i" in FIG. 10B, in a state in which a current is flowing from the electric motor 18 toward the point of connection between the upper FET 111 and the lower FET 112, on the other hand, a current flows through the diode 121, which is connected in inverse parallel with the upper FET 111, as indicated by an arrow 142 during a dead time period. Thus, the output voltage (phase voltage) Vu is at H level during the dead time period. Therefore, the period during which the phase voltage Vu is at L level is shorter than an off period of the upper FET 111. In other words, the period during which the phase voltage Vu is at H level is longer than an on period of the upper FET 111.

In the case where the PWM count is equal to or more than half the maximum value of the PWM count (equal to or more than 250) for U-phase and W-phase which are the first on/off pattern phases, the on time of the upper FETs is longer than that for a case where the PWM count is not equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is equal to or more than 250. Therefore, it is considered that the output voltage (phase voltage) is at L level during a dead time period. Thus, in this case, it is considered that the phase voltage is varied as indicated by (c) in FIG. 9, and thus the level variation timing of the phase voltage and the switching timing of the upper FET coincide with each other.

In the case where the PWM count is not equal to or more than half the maximum value of the PWM count (not equal to or more than 250) for U-phase and W-phase, on the other hand, the on time of the upper FETs is shorter than that for a case where the PWM count is equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is not equal to or more than 250. Therefore, it is considered that the output voltage (phase voltage) is at H level during a dead time period. Thus, in this case, it is considered that the phase voltage is varied as indicated by (d) in FIG. 9, and thus the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by adding a count value (in the embodiment, "10") corresponding to the dead time to the actual PWM count.

In the case where the PWM count is equal to or more than half the maximum value of the PWM count (equal to or more than 250) for V-phase which is the second on/off pattern phase, the on time of the upper FETs is shorter than that for a case where the PWM count is not equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is equal to or more than 250. Therefore, it is considered that the output voltage (phase voltage) is at H level during a dead time period. Thus, in this case, it is considered that the phase voltage is varied as indicated by (g) in FIG. 9, and thus the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by subtracting a count value (in the embodiment, "10") corresponding to the dead time from the actual PWM count.

In the case where the PWM count is not equal to or more than half the maximum value of the PWM count (not equal to or more than 250) for V-phase, on the other hand, the on time of the upper FET is longer than that for a case where the PWM count is equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is not equal to or more than 250. Therefore, it is considered that the output voltage (phase voltage) is at L level during a dead time period. Thus, in this case, it is considered that the phase voltage is varied as indicated by (h) in FIG. 9, and thus the level variation timing of the phase voltage and the switching timing of the upper FET coincide with each other.

In the embodiment, for convenience of description, the direction of the phase current for each phase is estimated on the basis of whether or not the PWM count is equal to or more than half the maximum value of the PWM count. However, the direction of the phase current may be estimated on the basis of a detected value of the phase current. In step S2, for each PWM count in the PWM cycle Tc for each phase set in step S1, the common mode noise reduction section 47 computes a PWM count (PWM count at the actual timing) corresponding to the level variation timing of the output voltage (phase voltage) for the relevant phase.

Specifically, for a PWM count that is equal to or more than 250, of the U-phase and W-phase PWM counts Cu and Cw for each PWM cycle Tc in the next current control cycle Ta, the common mode noise reduction section 47 sets the value of the PWM count, as it is, as the PWM count corresponding to the level variation timing of the output voltage (phase voltage) for the relevant phase. For a PWM count that is not equal to or more than 250, of the U-phase and W-phase PWM counts Cu and Cw, the common mode noise reduction section 47 sets a value obtained by adding a count value (in the embodiment, "10") corresponding to the dead time to the value of the PWM count as the PWM count corresponding to the level variation timing of the output voltage (phase voltage) for the relevant phase.

For a PWM count that is equal to or more than 250, of the V-phase PWM count Cv for each PWM cycle Tc in the next current control cycle Ta, the common mode noise reduction section 47 sets a value obtained by subtracting a count value (in the embodiment, "10") corresponding to the dead time from the value of the PWM count as the PWM count corresponding to the level variation timing of the output voltage (phase voltage) for the relevant phase.

For a PWM count that is not equal to or more than 250, of the V-phase PWM counts Cv, the common mode noise reduction section 47 sets the value of the PWM count, as it is, as the PWM count corresponding to the level variation timing of the output voltage (phase voltage) for the relevant phase. In the case where the PWM count in each PWM cycle for each phase set in step S is as indicated in FIG. 11A, the PWM count in each PWM cycle for each phase set in step S2 is as indicated in FIG. 11B. When FIGS. 11A and 11B are compared with each other, it is seen that the PWM count Cv for V-phase is varied from 300 to 290, and that the PWM count Cw for W-phase is varied from 100 to 110.

Next, the common mode noise reduction section 47 sets, of the respective phases, a phase that has a PWM count that is the closest to the maximum value (in the embodiment, "500") or the minimum value (in the embodiment, "0") of the PWM count, of the PWM counts which are set in the process in step S2, as a reference phase (step S3). In the example in FIG. 11B, the PWM count Cu (Cu=400) for U-phase (corresponding to A-phase or B-phase) is the closest to 500 or 0, and thus U-phase is set as the reference phase. In the embodiment, in the case where one of A-phase and B-phase is set as the reference phase, the one of the phases that is set as the reference phase is referred to as A-phase, and the other is referred to as B-phase. In the embodiment, in the case where U-phase is set as the reference phase, U-phase serves as A-phase, and W-phase serves as B-phase.

Next, the common mode noise reduction section 47 determines whether or not the reference phase is A-phase or B-phase (step S4). In the example in FIG. 11B, U-phase is set as the reference phase, and thus it is determined that the reference phase is A-phase or B-phase. In the case where it is determined that the reference phase is A-phase or B-phase (step S4: YES), the common mode noise reduction section 47 performs a first PWM count change process (step S5).

The first PWM count change process will be described in detail using FIGS. 11A and 11B as an example. In the example in FIG. 11B, as discussed earlier, U-phase is set as the reference phase. The common mode noise reduction section 47 assigns C-phase (V-phase) as a first count change target phase, the PWM count for which is to be changed in order to cancel out a noise current for A-phase (U-phase) which is the reference phase. The common mode noise reduction section 47 assigns one (in the example, B-phase (W-phase)) of A-phase and B-phase that is not the reference phase as a second count change target phase, the PWM count for which is to be changed in order to cancel out a noise current for C-phase (V-phase) after a count change.

The common mode noise reduction section 47 sets an amplitude for canceling out a noise current for the count change target phases (in the example, C-phase (V-phase) and B-phase (W-phase)). In order to change a PWM count value for a certain count change target phase such that the total value of PWM count values in the current control cycle Ta is not changed, it is only necessary that one of an amplitude that matches a first amplitude pattern indicated in FIG. 12A and an amplitude that matches a second amplitude pattern indicated in FIG. 12A, for example, should be added to the PWM count value for the relevant count change target phase. The symbol "x" in FIG. 12A indicates an amplitude prescription value that prescribes the absolute value of the amplitude. In the embodiment, the first amplitude pattern is assigned to the first count change target phase (C-phase (V-phase)), and the second amplitude pattern is assigned to the second count change target phase (B-phase (W-phase)).

The common mode noise reduction section 47 computes the amplitude prescription value x for each of C-phase (V-phase) as the first count change target phase and B-phase (W-phase) as the second count change target phase on the basis of the PWM count, which is set in the process in step S2, as follows. The common mode noise reduction section 47 computes the absolute value of the difference between the PWM count for C-phase (V-phase) and the PWM count for the reference phase (A-phase (U-phase)), a noise current for which should be canceled out, as the amplitude prescription value x for C-phase (V-phase). In the example, the amplitude prescription value x for C-phase (V-phase) is 110 (=400−290). Consequently, a first computation value obtained by adding the amplitude prescription value x for C-phase (V-phase) to the PWM count for C-phase (V-phase) is 400 (=290+110). A second computation value obtained by subtracting the amplitude prescription value x for C-phase (V-phase) from the PWM count for C-phase (V-phase) is 180 (=290−110).

The common mode noise reduction section 47 computes the absolute value of the difference between one (in the example, the second computation value) of the first computation value and the second computation value that is different from the PWM count for A-phase (UI-phase), which is the reference phase, and the PWM count for B-phase (W-phase) as the amplitude prescription value x for B-phase (W-phase). In the example, the amplitude prescription value x for B-phase (W-phase) is 70 (=180−110).

The common mode noise reduction section 47 sets an amplitude in each PWM cycle Tc for each count change target phase on the basis of the amplitude prescription value x for each count change target phase computed in this manner and the amplitude pattern which is applied to the relevant phase. The amplitudes in each PWM cycle Tc for C-phase (V-phase) and B-phase (W-phase), which are set on the basis of the PWM counts in each PWM cycle for each phase indicated in FIG. 11B, are indicated in FIG. 12B.

Next, the common mode noise reduction section 47 changes the PWM count for the count change target phase, which is set in step S1, in accordance with the amplitude for the count change target phase. More specifically, the common mode noise reduction section 47 adds, to the PWM count for the count change target phase in each PWM cycle Tc, which is set in step S1, the amplitude for the count change target phase. Consequently, the common mode noise reduction section 47 changes the PWM count for the count change target phase in each PWM cycle Tc. Consequently, the first PWM count change process is ended.

Next, the common mode noise reduction section 47 provides the PWM output section 48 with the U-phase, V-phase, and W-phase PWM counts Cu, Cv, and Cw in each PWM cycle after the first PWM count change process in step S5 as the final U-phase, V-phase, and W-phase PWM counts Cu, Cv, and Cw for each PWM cycle Tc in the next current control cycle Ta (step S6). Then, the common mode noise reduction section 47 ends the process in the present current control cycle Ta.

In the case where the PWM count in each PWM cycle for each phase, which is set in step S1, has a value indicated in FIG. 11A and the amplitudes for the count change target phases have values indicated in FIG. 12B, the final PWM count in each PWM cycle for each phase is as indicated in FIG. 12C. The PWM count (PWM count at the actual timing) corresponding to the level variation timing of each phase voltage that matches the final PWM count, which is indicated in FIG. 12C, is as indicated in FIG. 12D. The PWM counts in each PWM cycle for the count change target phases in FIG. 12D can be obtained by adding, to the PWM counts in each PWM cycle for the count change target phases which are set in step S2, the amplitudes for the corresponding count change target phases which are computed in step S5.

As indicated in FIG. 12D, the PWM count for U-phase (first on/off pattern phase) in odd-numbered PWM cycles Tc coincides with the PWM count for V-phase (second on/off pattern phase). Therefore, in the odd-numbered PWM cycles Tc, a noise current that flows through the stray capacitance C1 (see FIG. 3) on the electric motor 18 side because of an output voltage (phase voltage) for U-phase is canceled out with a noise current that flows through the stray capacitance C1 on the electric motor 18 side because of an output voltage (phase voltage) for V-phase. The PWM count for V-phase (second on/off pattern phase) in even-numbered PWM cycles Tc coincides with the PWM count for W-phase (first on/off pattern phase). Therefore, in the even-numbered PWM cycles Tc, a noise current that flows through the stray capacitance C1 (see FIG. 3) on the electric motor 18 side because of an output voltage (phase voltage) for V-phase is canceled out with a noise current that flows through the stray capacitance C1 on the electric motor 18 side because of an output voltage (phase voltage) for W-phase. Consequently, common mode noise is reduced.

In the case where it is determined in step S4 that the reference phase is C-phase (step S4: NO), the common mode noise reduction section 47 performs a second PWM count change process (step S7). In the embodiment, in the case where C-phase is set as the reference phase, one of the two phases other than C-phase is referred to as A-phase, and the other is referred to as B-phase. In the embodiment, U-phase, of U-phase and W-phase which are the two phases other than C-phase, is referred to as A-phase, and W-phase is referred to as B-phase.

The second PWM count change process will be described in detail with reference to FIGS. 13A and 13B. FIG. 13A is a schematic table illustrating an example of the U-phase, V-phase, and W-phase PWM counts Cu, Cv, and Cw in each PWM cycle Tc in the current control cycle Ta set in step S1. In the case where the PWM count in each PWM cycle for each phase set in step S1 is as indicated in FIG. 13A, the PWM count in each PWM cycle for each phase set in step S2 is as indicated in FIG. 13B. From a comparison between FIGS. 13A and 13B, it is seen that the PWM count Cv for V-phase (C-phase) is varied from 400 to 390. In the example in FIG. 13B, the PWM count Cv (Cv=390) for V-phase (corresponding to C-phase) is the closest to 500 or 0, and thus V-phase is set as the reference phase in step S3. Therefore, it is determined in step S4 that the reference phase is C-phase.

In the second PWM count change process, the common mode noise reduction section 47 first assigns two phases, namely A-phase (U-phase) and B-phase (W-phase), as count change target phases, the PWM count for which is to be changed in order to cancel out a noise current for C-phase (V-phase) which is the reference phase. Hereinafter, A-phase (U-phase) will be referred to as a first count change target phase, and B-phase (W-phase) will be referred to as a second count change target phase.

The common mode noise reduction section 47 sets an amplitude for canceling out a noise current for the count change target phases (in the example, A-phase (U-phase) and B-phase (W-phase)). In order to change a PWM count value for a certain count change target phase such that the total value of PWM count values in the current control cycle Ta is not changed, it is only necessary that one of an amplitude that matches a first amplitude pattern indicated in FIG. 14A and an amplitude that matches a second amplitude pattern indicated in FIG. 14A, for example, should be added to the PWM count value for the relevant count change target phase. The symbol "x" in FIG. 14A indicates an amplitude prescription value that prescribes the absolute value of the amplitude. In the embodiment, the first amplitude pattern is assigned to the first count change target phase, namely A-phase (U-phase), and the second amplitude pattern is assigned to the second count change target phase, namely B-phase (W-phase).

The common mode noise reduction section 47 computes the amplitude prescription value x for each of A-phase (U-phase) as the first count change target phase and B-phase (W-phase) as the second count change target phase on the basis of the PWM count, which is set in the process in step S2, as follows. The common mode noise reduction section 47 computes the absolute value of the difference between the PWM count for A-phase (U-phase) and the PWM count for C-phase (V-phase), a noise current for which should be canceled out, as the amplitude prescription value x for A-phase (U-phase). In the example, the amplitude prescription value x for A-phase (U-phase) is 30 (=390−360). The common mode noise reduction section 47 computes the absolute value of the difference between the PWM count for B-phase (W-phase) and the PWM count for C-phase (V-phase), a noise current for which should be canceled out, as the amplitude prescription value x for B-phase (W-phase). In the example, the amplitude prescription value x for B-phase (W-phase) is 110 (=390−280).

The common mode noise reduction section 47 sets an amplitude in each PWM cycle Tc for each count change target phase on the basis of the amplitude prescription value x for each count change target phase computed in this manner and the amplitude pattern which is applied to the relevant phase. The amplitudes in each PWM cycle Tc for U-phase and W-phase, which are set on the basis of the PWM counts in each PWM cycle for each phase indicated in FIG. 13B, are indicated in FIG. 14B.

Next, the common mode noise reduction section 47 changes the PWM count for the count change target phase for each PWM cycle Tc in the next current control cycle Ta, which is set in step S1, in accordance with the amplitude for the count change target phase. More specifically, the common mode noise reduction section 47 changes the PWM count for the count change target phase in each PWM cycle Tc by adding the amplitude for the count change target phase to the PWM count for the count change target phase in each PWM cycle Tc which is set in step S1. Consequently, the second PWM count change process is ended.

Next, the common mode noise reduction section 47 provides the PWM output section 48 with the U-phase, V-phase, and W-phase PWM counts Cu, Cv, and Cw in each PWM cycle after the second PWM count change process in step S7 as the final U-phase, V-phase, and W-phase PWM counts Cu, Cv, and Cw for each PWM cycle Tc in the next current control cycle Ta (step S8). Then, the common mode noise reduction section 47 ends the process in the present current control cycle Ta.

In the case where the PWM count in each PWM cycle for each phase, which is set in step S1, has a value indicated in FIG. 13A and the amplitudes for the count change target phases have values indicated in FIG. 14B, the final PWM count in each PWM cycle for each phase is as indicated in FIG. 14C. The PWM count (PWM count at the actual timing) corresponding to the level variation timing of each phase voltage that matches the final PWM count, which is indicated in FIG. 14C, is as indicated in FIG. 14D. The PWM counts in each PWM cycle for the count change target phases in FIG. 14D can be obtained by adding, to the PWM counts in each PWM cycle for the count change target phases which are set in step S2, the amplitudes for the corresponding count change target phases which are computed in step S7.

As indicated in FIG. 14D, the PWM count for V-phase (second on/off pattern phase) in odd-numbered PWM cycles Tc coincides with the PWM count for U-phase (first on/off pattern phase). Therefore, in the odd-numbered PWM cycles T1, a noise current that flows through the stray capacitance C1 (see FIG. 3) on the electric motor 18 side because of an output voltage (phase voltage) for V-phase is canceled out with a noise current that flows through the stray capacitance C1 on the electric motor 18 side because of an output voltage (phase voltage) for U-phase. The PWM count for V-phase (second on/off pattern phase) in even-numbered PWM cycles Tc coincides with the PWM count for W-phase (first on/off pattern phase). Therefore, in the even-numbered PWM cycles Tc, a noise current that flows through the stray capacitance C1 (see FIG. 3) on the electric motor 18 side because of an output voltage (phase voltage) for V-phase is canceled out with a noise current that flows through the stray capacitance C1 on the electric motor 18 side because of an output voltage (phase voltage) for W-phase. Consequently, common mode noise is reduced.

In the embodiment, the present invention is applied to a motor control device for an electric power steering system. However, the present invention is also applicable to a motor control device that is used for devices other than an electric power steering system. Besides, a variety of design changes may be made without departing from the scope defined in the claims.

What is claimed is:

1. A motor control device that controls an electric motor on the basis of a pulse width modulation (PWM) signal generated for each of a plurality of PWM cycles included in a current control cycle, the motor control device comprising:
   a PWM count computation unit that computes a PWM count for each of three phases for each current control cycle;
   a PWM count setting unit that sets the PWM count for each phase in the current control cycle as a PWM count for each PWM cycle in the relevant current control cycle for the corresponding phase; and
   a common mode noise reduction unit that changes the PWM count in a PWM cycle for at least one phase, of two of the three phases other than one desired phase, such that a current that flows through a stray capacitance because of an output voltage for the one desired phase is canceled out with a current that flows through the stray capacitance because of an output voltage for the at least one of the two other phases in at least one PWM cycle in the current control cycle, wherein
   the common mode noise reduction unit includes a PWM count change unit that changes the PWM count for at least one of the two other phases, of the PWM counts for the three phases for each PWM cycle in the current control cycle, such that an output voltage waveform for the relevant phase is a waveform obtained by inverting an output voltage waveform for the one desired phase in at least one PWM cycle without changing a total value of PWM counts for the relevant phase in the relevant current control cycle.

2. The motor control device according to claim 1, wherein:
   the PWM count change unit includes a first PWM count change unit that changes a PWM count in a PWM cycle such that a current that flows through a stray capacitance because of an output voltage for a first phase, which is the one desired phase of the three phases, is canceled out with a current that flows through the stray capacitance because of an output voltage for a second phase, which is one of the two other phases, in half a predetermined number of PWM cycles in the current control cycle, and such that the current that flows through the stray capacitance because of the output voltage for the second phase is canceled out with a current that flows through the stray capacitance because of an output voltage for a third phase, which is the other of the two other phases, in the other half of the predetermined number of PWM cycles in the current control cycle; and
   the first PWM count change unit includes
      a first unit that changes the PWM count for the second phase for each PWM cycle in the current control cycle such that an output voltage waveform for the second phase is a waveform obtained by inverting the output voltage waveform for the first phase in half the predetermined number of PWM cycles in the current control cycle without changing a total value of PWM counts for the second phase in the relevant current control cycle, and
      a second unit that changes the PWM count for the third phase for each PWM cycle in the current control cycle such that an output voltage waveform for the third phase is a waveform obtained by inverting the output voltage waveform for the second phase after being changed by the first PWM count change unit in the other half of the predetermined number of PWM cycles in the current control cycle without changing a total value of PWM counts for the third phase in the relevant current control cycle.

3. The motor control device according to claim 1, wherein:
   the PWM count change unit includes a second PWM count change unit that changes a PWM count in a PWM cycle such that a current that flows through a stray capacitance because of an output voltage for a first phase, which is the one desired phase of the three phases, is canceled out with a current that flows through the stray capacitance because of an output voltage for one of second and third phases, which are the two other phases, in each PWM cycle in the current control cycle; and
   the second PWM count change unit includes
      a third unit that changes the PWM count for the second phase for each PWM cycle in the current control cycle such that an output voltage waveform for the second phase is a waveform obtained by inverting the output voltage waveform for the first phase in half a predetermined number of PWM cycles in the current control cycle without changing a total value of PWM counts for the second phase in the relevant current control cycle, and
      a fourth unit that changes the PWM count for the third phase for each PWM cycle in the current control cycle such that an output voltage waveform for the third phase is a waveform obtained by inverting the output voltage waveform for the first phase in the other half of the predetermined number of PWM cycles in the current control cycle without changing a total value of PWM counts for the third phase in the relevant current control cycle.

4. The motor control device according to claim 1, wherein the common mode noise reduction unit includes
   a first PWM count change unit that changes a PWM count in a PWM cycle such that a current that flows through a stray capacitance because of an output voltage for a first phase, which is the one desired phase of the three phases, is canceled out with a current that flows through the stray capacitance because of an output voltage for a second phase, which is one of the two other phases, in half a predetermined number of PWM cycles in the current control cycle, and such that the current that flows through the stray capacitance because of the output voltage for the second phase is canceled out with a current that flows through the stray capacitance because of an output voltage for a third phase, which is the other of the two other phases, in the other half of the predetermined number of PWM cycles in the current control cycle,
   a second PWM count change unit that changes a PWM count in a PWM cycle such that a current that flows through a stray capacitance because of an output voltage for a first phase, which is one particular phase of the three phases, is canceled out with a current that flows through the stray capacitance because of an output voltage for one of second and third phases, which are the two other phases, in each PWM cycle in the current control cycle, and a selection unit that selects one of the first PWM count change unit and the second PWM count change unit as the PWM count change unit in accordance with a predetermined determination criterion in each current control cycle.

* * * * *